United States Patent [19]

Wilson

[11] Patent Number: 5,448,867
[45] Date of Patent: Sep. 12, 1995

[54] FOLDABLE ASSEMBLY OF LIKE SIZE AND SHAPE STRUCTURAL MEMBERS, FOLDABLE FOR HANDLING, PACKAGING, SHIPPING, AND STORAGE, AND UNFOLDED AND UTILIZED AS PRINCIPAL MEMBERS OF STRUCTURES

[76] Inventor: Donald M. Wilson, 11416 105th SW., Apt. G10, Tacoma, Wash. 98498

[21] Appl. No.: 297,143

[22] Filed: Aug. 29, 1994

Related U.S. Application Data

[62] Division of Ser. No. 72,468, Jun. 4, 1993, Pat. No. 5,363,627.

[51] Int. Cl.6 .............................................. E04B 1/32
[52] U.S. Cl. .......................................... 52/641; 52/86; 52/643; 52/653.1
[58] Field of Search .................... 52/86, 109, 641, 643, 52/645, 653.1

[56] References Cited

U.S. PATENT DOCUMENTS

| | | |
|---|---|---|
| Re. 31,565 | 4/1984 | Beaulieu . |
| 3,375,624 | 4/1968 | Mikulin . |
| 3,557,500 | 1/1971 | Schmidt et al. . |
| 3,559,353 | 2/1971 | Partridge . |
| 3,729,877 | 5/1973 | Hall . |
| 4,290,244 | 9/1981 | Zeigler .............................. 52/86 X |
| 4,689,932 | 9/1987 | Zeigler . |
| 5,024,031 | 6/1991 | Hoberman . |
| 5,038,532 | 8/1991 | Shahinpoor ........................... 52/109 |

FOREIGN PATENT DOCUMENTS 561315 5/1944 United Kingdom .................... 52/86

*Primary Examiner*—Carl D. Friedman
*Assistant Examiner*—Kevin D. Wilkens
*Attorney, Agent, or Firm*—Roy E. Mattern, Jr.

[57] ABSTRACT

Principal members of structures are manufactured as foldable assemblies of like size and shape structural members, foldable for handling, packaging, shipping, and storage, and unfolded into their respective principal member configurations. Each like size and shape structural member has its opposite end surfaces formed on a sixty degree bias, whereby one longitudinal edge surface is longer than the other opposite edge surface, thereby creating opposite trapezoidal side surfaces. Each of these members has two spaced holes formed along its centerline, and each of these holes is equally spaced from a respective bias end. Regarding relative design dimensions, the respective longitudinal centerline length of each like size and shaped structural member is given the formula dimension, L, then the space between holes, X, is equal to 0.464 L, and the space from each hole to the centerline end, Y, is equal to 0.268 L. Using fasteners passing through respective aligned holes, these like size and shape structures are arranged as pivotal members, in two adjacent parallel planes, each plane staying within the thickness of the thickness size of one like size and shape structural member, to become, when unfolded, a complete principal member of a structure, in reference to 360 degrees, either in a vertical plane or a horizontal plane.

12 Claims, 6 Drawing Sheets

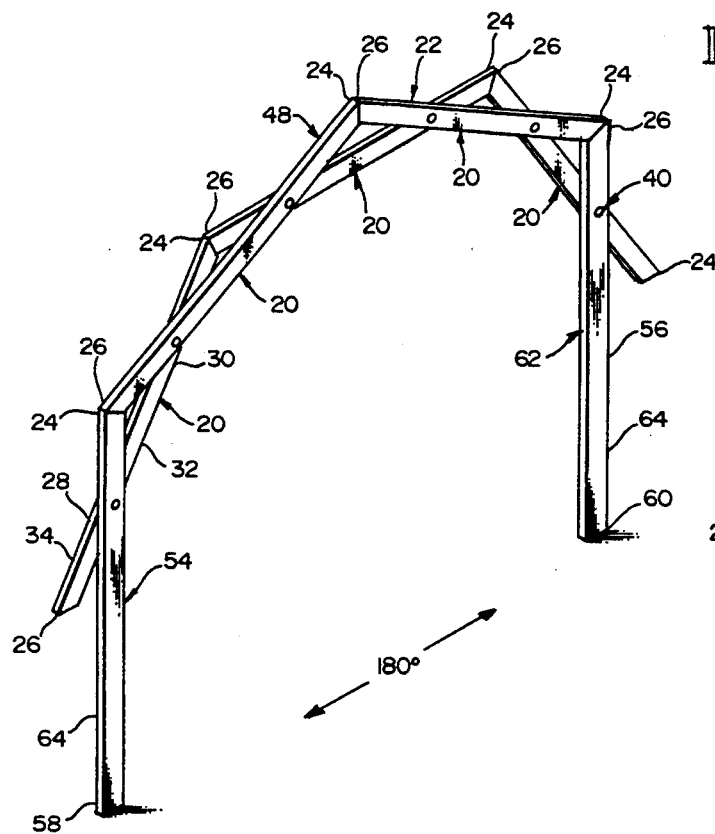
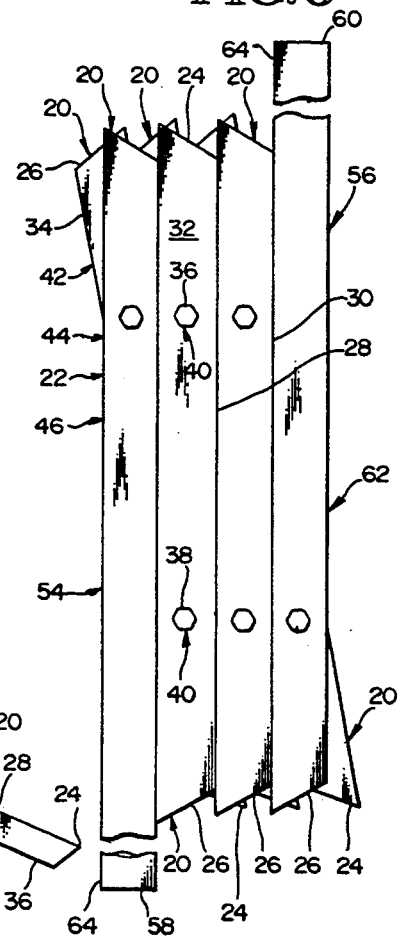
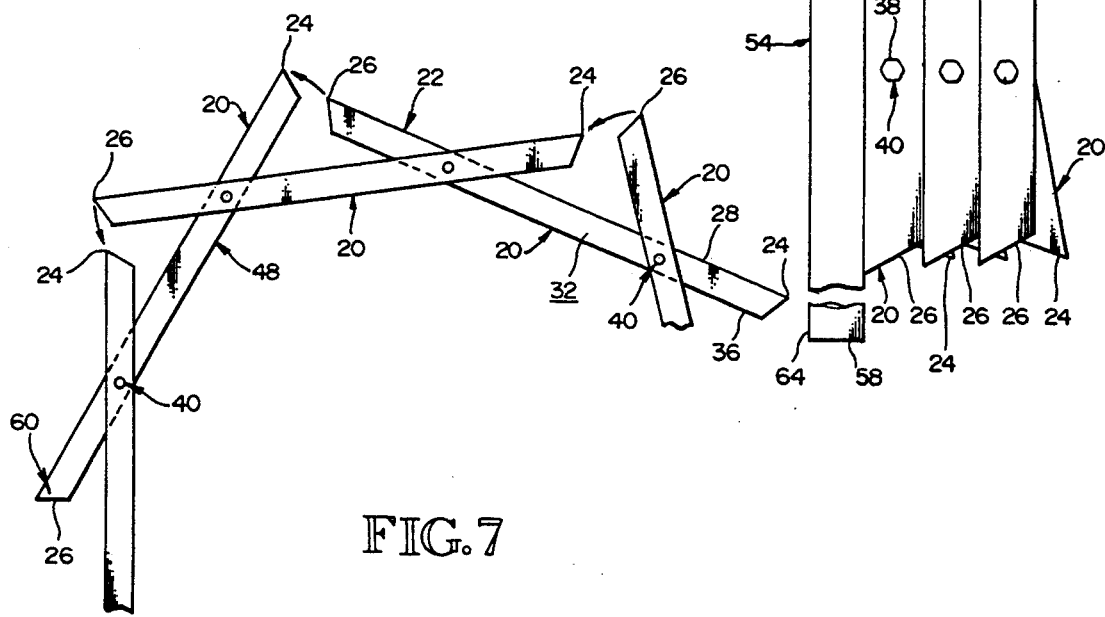
FIG. 5
FIG. 6
FIG. 7

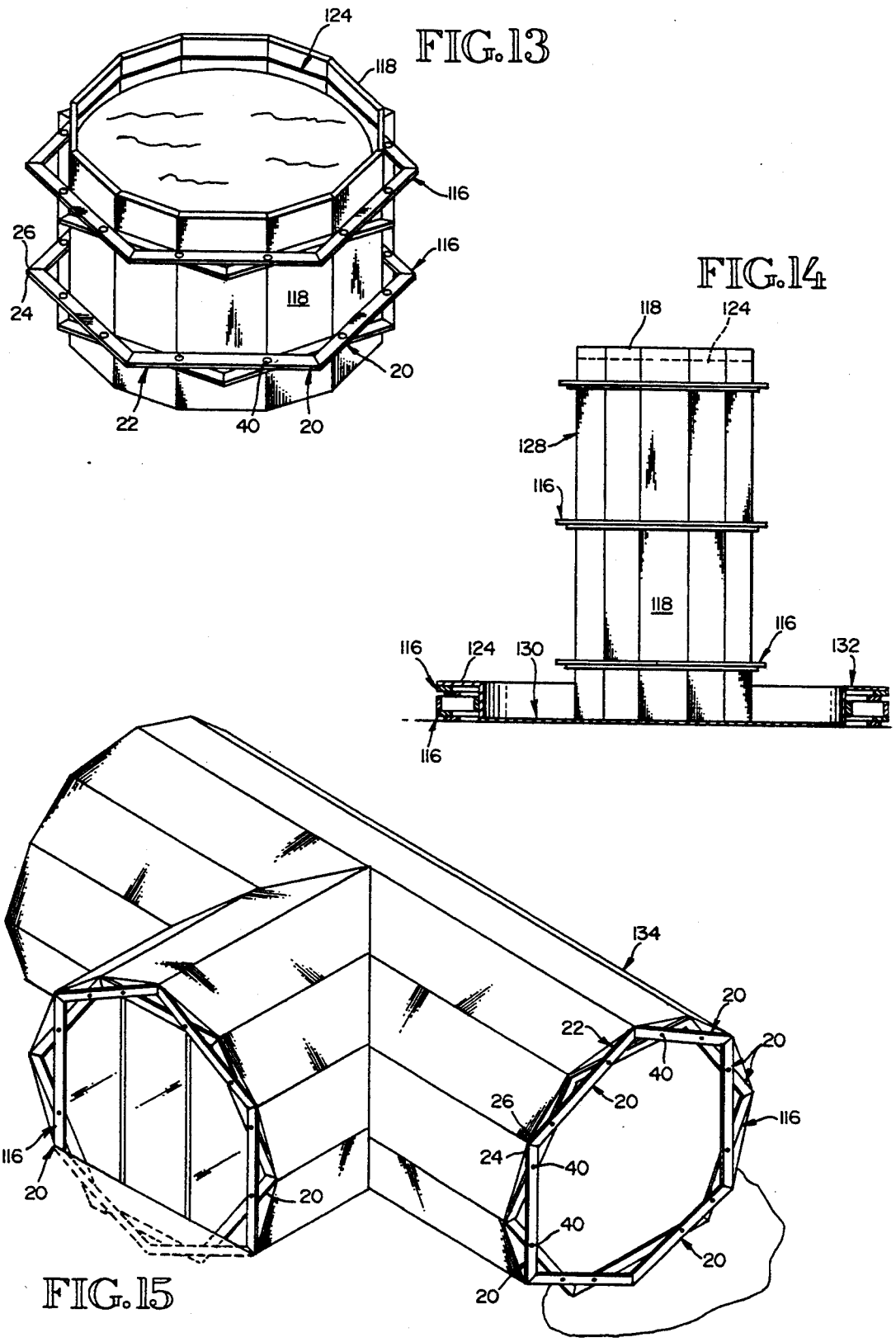

FOLDABLE ASSEMBLY OF LIKE SIZE AND SHAPE STRUCTURAL MEMBERS, FOLDABLE FOR HANDLING, PACKAGING, SHIPPING, AND STORAGE, AND UNFOLDED AND UTILIZED AS PRINCIPAL MEMBERS OF STRUCTURES

CROSS REFERENCE

This is a Divisional Application based on the original application Ser. No. 08/072,468, filed on Jun. 4, 1993, now Pat. 5,363,626.

BACKGROUND

Pre-manufactured structural building components to be unfolded at building sites to become principal structural members of buildings have been provided previously. For example:

In U.S. Pat. No. 3,375,624 of 1968, Tom T. Mikulin illustrated and described his structural members which included lazy tong components. His members are expandable from a contracted condition, occupying very little space, to a greatly enlarged condition having a great deal of strength;

In U.S. Pat. No. 3,557,500 of 1971, Messrs. Schmidt and Rial disclosed their foldable structures. They provide structural units, used with similar units, to form structures of different shape and size. Their structural units are readily erected, readily folded, and readily collapsed;

In U.S. Pat. No. 3,559,353 of 1971, Gordon C. Partridge illustrated and described his collapsible building structures, which are erected easily, and also easily collapsed for movement to another site, or for storage, or for transportation. His structures have at least two latticework units, in a parallel relationship. Each unit has links pivotally connected to be expanded from a collapsed arrangement to an operative formation of a beam or a truss;

In U.S. Pat. No. 3,729,877 of 1973, Raymond L. Hall disclosed his folding truss, wherein his main beam member in a fully unfolded opened position is arranged in a straight line. In its folded position his folding truss is compacted into an accordion style. In addition to the main beam members he uses a series of support arms. They are pivotally mounted on pins secured to the mid-portions of the main beam members. When the main beam members are aligned, the support members are disposed in a zigzag pattern relative to the axis of the main straight beam;

In U.S. Pat. No. Re 31,565 of 1984, Bryan J. Beaulieu illustrated and described his portable shelter. It has a pair of collapsible frame members at the ends thereof. Each of those collapsible frame members included a braced lazy-tong structure;

In U.S. Pat. No. 4,689,932 of 1987, Theodore R. Ziegler disclosed his portable shelter assemblies. Their framework is formed by a series of end-interconnected modules, each defining a separate arch portion, extending in different directions. Each module is formed of elongated struts capable of being expanded into arched three dimensional form and collapsed into bundled form; and In U.S. Pat. No. 5,024,031 of 1991, Charles Hoberman illustrated and described his radial expansion and retraction truss structures. They provided self-supporting structures that maintain their overall curved geometry, as they expand or collapse in a synchronized manner. In one embodiment, the radial expansion and retraction truss appears as an iris-type retractable structure. Its center retracts toward its perimeter, which remains a nearly constant size.

These examples of pre-manufactured structural building components to be unfolded at building sites are all recognized for their respective merits. However there remains a need for yet another one which is economically manufactured, handled, stored, shipped, and erected in combination with other standard building materials.

SUMMARY

There are many needs for erecting structures in small, medium, and large sizes more conveniently. Often these needs involve circumstances, which preferably require efficient and convenient pre-manufacturing, handling, packaging, shipping, and storage. The principal members of such structures, when being finally assembled, must be quickly and easily assembled into very strong structural members. These needs extend, for example, from the mass type marketing of garden houses to be conveniently assembled at their places of use, to shipping building components to Alaska to be assembled during limited warmer weather times on ground areas, often referred to as tundra, which in turn often involve permafrost ground conditions.

Therefore, to provide the principal members of such structures, foldable assemblies of like size and shape structural members are pre-manufactured. They are folded at time of manufacture for handling, packaging, shipping, and storage, and unfolded at the erection site to be utilized as the principal members of structures.

Each like size and shape structural member of a particular designed respective overall size principal member of a structure, has its opposite end surfaces formed on a sixty degree bias, whereby one longitudinal edge surface is longer than the opposite edge surface. Therefore, each of these members, when observed from either side, appears as a trapezoidal side surface structure.

Along a longitudinal centerline of each of these trapezoidal side surfaces, two spaced through holes are made, based on the formula dimension, L, for the length along this centerline. The space between the holes, X, is equal to $0.464L$, and the space from each hole to the centerline end, Y, is equal to $0.268L$.

When fastener assemblies are inserted through these spaced holes, as the side by side like size and shape structural members are pivotally secured together, then a foldable assembly is completed and compactly arranged in a planar configuration. These foldable assemblies, in reference to 180 degrees when unfolded, become, for example, the trusses of buildings. When more like members are included in these foldable assemblies, in reference to 360 degrees when unfolded, become an entire circumferential principal structural member, optionally arranged in selected designs in either vertical or horizontal planes.

By way of example, these foldable assemblies of like size and shape structural members, when combined with other members selected from available standard materials, are used in structures such as garden houses, greenhouses, storage buildings, carports, garages, boat shelters, military field shelter-housing-storage, temporary housing in disaster areas, Arctic and Antarctic temporary housing for survey crews and scientists, covers for walkways, silos, hot tubs, liquid holding tanks, liquid spill dams, and sludge lagoons.

DRAWINGS

The foldable assembly of like size and shape structural members, foldable for handling, packaging, shipping, and storage, and unfolded and utilized, as principal members of structures, is illustrated in the drawings in two basic embodiments, and also in embodiments, in which one or the other of the two basic embodiments is utilized with other like basic embodiments, as principal members of structures. In the drawings:

FIG. 5 is an enlarged view of the one of the three spaced like foldable assemblies of like size and shape structural members serving as roof trusses, as illustrated in FIGS. 1 and 2, with two of the structural members optionally being extended to serve also as columns;

FIG. 6 is a top view of the foldable assembly, shown in FIG. 5, when it is folded for handling, packaging, shipping, and storage;

FIG. 7 is a partial side view of some of the like size and shape structural members, illustrated in FIG. 5, showing how they are being assembled after being unfolded, from their folded together arrangement, shown in FIG. 6, into their assembled arrangement, shown in FIG. 5;

FIG. 13 is a perspective view of a structure holding liquid, such as a hot tub, in which the fully surrounding frame, arranged in spaced horizontal planes, are made of like size and shape structural members, and showing how some other structural members, serving as wall members, are arranged within the fully surrounding frames, and also showing a liquid containing liner;

Figure 16:
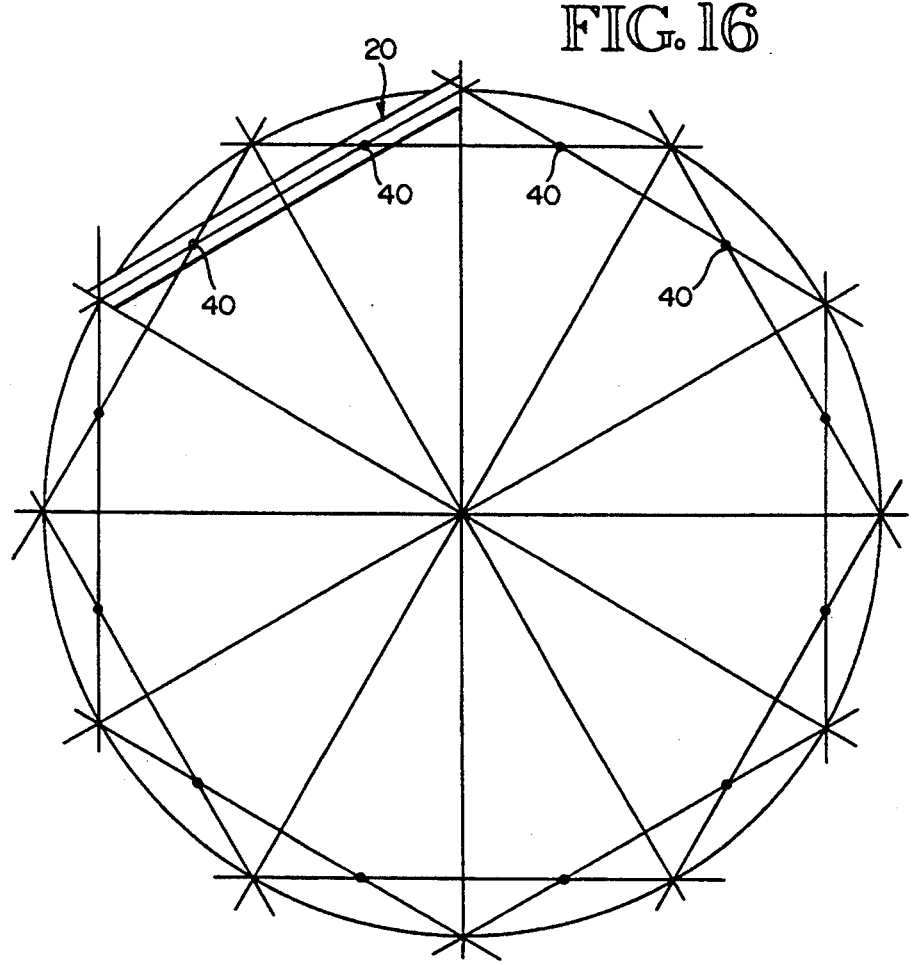
Figure 17:
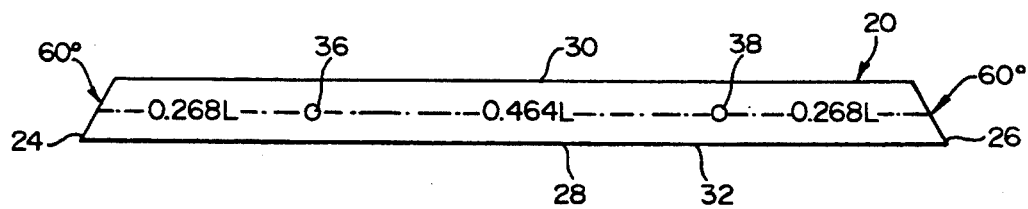

FIG. 14 is a side elevational view, partially in section, illustrating a tank holding a liquid such as oil, having three spaced fully surrounding frames arranged in horizontal planes, which are made of like size and shape structural members, and showing wall members arranged within these fully surrounding frames, and also showing how a surrounding safety basin is provided to become effective if the tank overflows and/or leaks, and larger diameter fully surrounding frames are arranged concentrically with the tank to support liquid tight materials serving as a bottom and wall of this safety basin;

FIG. 15 is a perspective view of a building formed in a optional T configuration, and using throughout, spaced fully surrounding frames arranged in vertical planes, and they are all made from foldable assemblies of like size and shape structural members, which in turn support the longitudinal structural members;

FIG. 16 is a schematic layout of the centerlines of the like size and shape structural members arranged together continuously in a designated plane, with general formula letters and the relative numerals set forth to illustrate how the sizes of these structural members are determined, and where the fastener holes are located; and FIG. 17 is a view of one major surface of one like size and shape structural member, showing the centerline, the fastener holes, the sixty degree formed ends, and the formula letters and relative numerals.

DESCRIPTIONS OF PREFERRED EMBODIMENTS

Introduction

Like size and shape structural members are conveniently and economically manufactured for convenient assembly with other like members in selected embodiments of foldable assemblies. They are so folded for handling, packaging, shipping, and storage. At an erection site, they are unfolded and utilized as the principal members of structures. These foldable assemblies in respective embodiments later become the principal members, for example, as building trusses, in reference to their 180 degree unfolding, and as entire circumferential principal frames, optionally arranged in selected buildings in either vertical or horizontal planes, in reference to their 360 degree unfolding.

When these trusses and frames are combined with other members selected from available standard materials, the overall structures may be garden houses, greenhouses, storage buildings, carports, garages, boat shelters, military field shelter-housing-storage buildings, temporary housing in disaster areas, Arctic and Antarctic temporary housing for survey crews and scientists, covers for walkways, silos, hot tubs, liquid holding tanks, liquid spill dams, and sludge lagoons.

The Like Size and Shape Structure Member Available in Various Overall Sizes for a Particular Embodiment in which They Are All Alike in Size and Shape Each like size and shape structural member 20 to be used in a respective overall size principal member 22, has its opposite end surfaces 24, 26, formed on a sixty degree bias or angle. Therefore one edge 28 of its longitudinal opposite edge surfaces is longer than the other opposite edge surface 30. Each member 20, then has opposite trapezoidal side surfaces 32, 34.

Also each like size and shape structural member 20 has two spaced holes 36, 38, of like diameter, formed along its longitudinal centerline. Each of these holes 36, 38, is equally spaced from a respective bias end 24, 26, in reference to the longitudinal centerline.

Regarding relative design dimensions, the respective longitudinal centerline length of each like size and shape structural member is given the formula dimension, L. Then the space, X, between the holes 36, 38, is equal to 0.464L, and the space, Y, from each hole to the centerline end is equal to 0.268L.

Using fasteners 40 passing through respective aligned holes 36, 38, these like size and shape structural members 20, are arranged as pivotal members, in two adjacent parallel planes 42, 44. Each plane of pivotal members stays within the thickness of the thickness size of one like size and shape structural member 20. Upon assembling a principal structural member 22, at the outset in reference to three like size and shaped structural members 20, the first and third are in one adjacent plane 42 and the second is in the other adjacent plane 44. This relationship of up and down members 20 continues in reference to the two adjacent planes 42, 44 as the assembly is undertaken.

The resulting foldable assemblies 46 include sufficient like size and shape structural members 20, for example, to become, when unfolded, a truss 48 arranged in a vertical plane, in reference to one hundred and eighty degrees. If more members 20 are added, a foldable assembly 46 becomes, when unfolded, a complete frame 50, in reference to three hundred and sixty degrees to be used in either a vertical plane or a horizontal plane, as a principal member 22 of a structure. At all times the members of the foldable assemblies when in use are in compression.

Like Size and Shape Structural Members Supplemented by Terminal Members Serving Also as Columns In reference to 180 degrees, when a particular foldable assembly 46 is to be unfolded to become a truss 48, then preferably the terminal members 54, 56 are longer than the other like size and shape structural members 20, and serve as columns 54, 56, having squared lower ends 58, 60. This truss-column embodiment 62 is illustrated in FIGS. 1, 3, and 5 through 12.

Although not illustrated, the extra length portions 64 could be supplied separately for connection to like size and shape structural members to create the columns 54, 56. This connection procedure would be used when the initial shipping size restrictions would eliminate the initial column lengths.

Figure 2:
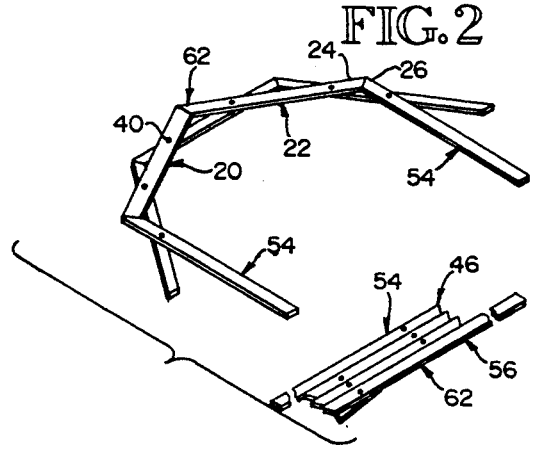
FIG. 2 is a perspective view of one of the three spaced like foldable assemblies of like size and shape structural members, serving as a roof truss when assembled, as illustrated in FIG. 1, and when folded for handling, shipping and storage, and in this embodiment two of the otherwise, like size and shape structural members are made longer to also serve as columns.

However, if the full length columns 54, 56 may be shipped, then folded assembly 46 will be premanufactured, as shown in FIGS. 2 and 6. At the building site, the folded assembly 46, will be unfolded, as illustrated in FIGS. 2, 5, 7, and 8.

The 180 degree embodiment of the truss, with or without columns, is kept in compression throughout all of its members. The transverse centerline dimension between the vertical members which are secured, per se, or as extended columns is 1.732L.

They are secured in their compression insuring positions by using a cross bracing compression member, and/or by using foundation members to which they are well secured.

Figure 8:
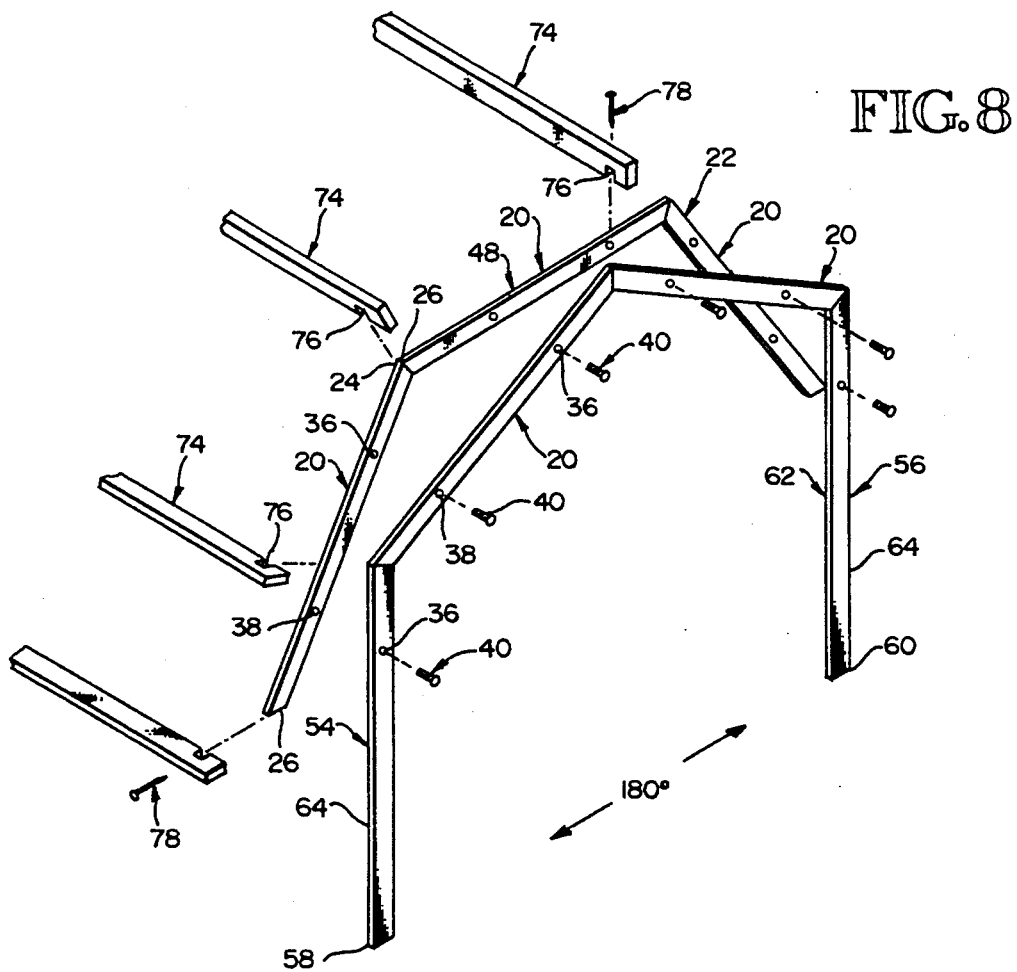
FIG. 8 is a partial exploded view, to illustrate the fasteners and the like spacing of the holes to receive these fasteners, the like size and shape of the structural members, with the exception of two of them in this embodiment, which are made longer to serve also as columns, and portions of spaced roof stringers, which are notched to fit over these structural members arranged as a roof truss.
Figure 9:
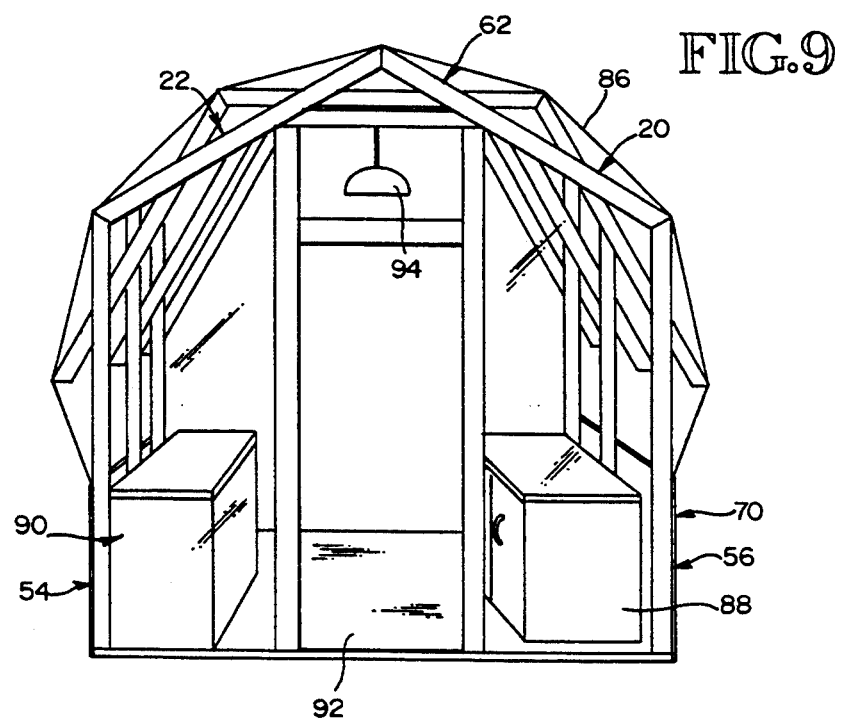
FIG. 9 is a perspective view of the interior of a structure, arranged as shown in FIG. 1, and being used as a garden house, with the roof and portions of the walls being made of clear materials.

Like Size and Shape Structural Members, with and Without Terminal Members Serving Also as Columns, Serve as Respective Overall Size Principal Members of Many Types of Buildings Garden houses and/or greenhouses, or other shelters using the like size and shape structural members, with terminal members serving also as columns, are particularly illustrated in FIGS. 1, 2, and 5 through 9. A garden house 68 shown in FIG. 1, at the outset, may have additions, as shown in FIG. 9, to become a greenhouse 70.

For example, three folded assemblies 46, as shown in FIGS. 2 and 6, are unfolded as shown in FIG. 7 to become the truss-column embodiments 62, illustrated in FIGS. 1, 2, 5, and 9. The premanufacture assembly of the foldable assembly 46, in respect to the holes 36, 38, and the fasteners 40, is indicated in FIG. 8. Also shown in FIG. 8, are stringers 74 or roof beams 74. These stringers 74 may be premanufactured and included with the folded assemblies 46, or they may be obtained later. Preferably, they will have receiving notches 76 to interfit with the truss-column embodiments 62. Thereafter a fastener 78 will be used to complete their securement.

Figure 1:
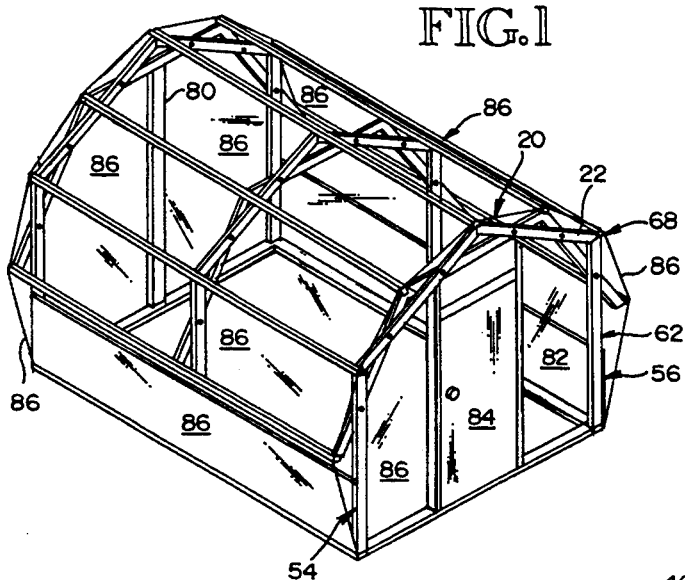
FIG. 1 is a perspective view of a building frame, which includes three spaced like foldable assemblies of like size and shape structural members, serving as roof trusses, when arranged in respective vertical planes.

As indicated in FIGS. 1 and 9, other portions of the garden house 68 or the greenhouse 70 will be derived from available products, referred to as standard market products. For example, as shown in FIGS. 1 and 9, two by four framing members 80, plywood panels 82, a door 84, clear or opaque plastic cover 86, cabinets 88, benches 90, floor 92, light 94, etc. may all be used to complete the designed building, utilizing the like size and shape structural members 20, arranged in their truss-column embodiment 62.

Figure 10:
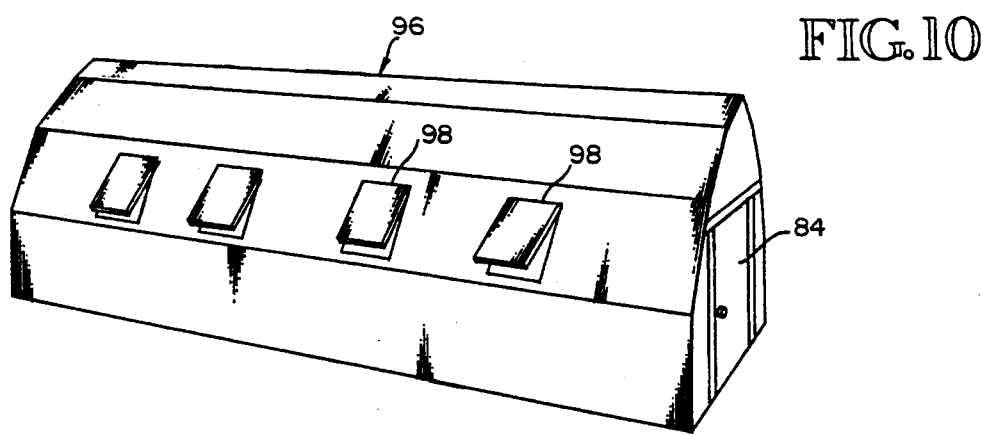
FIG. 10 is a perspective view of a building which could be used, for example, as a military field shelter for housing and/or storage, in which the roof trusses are foldable assemblies of like size and shape structural members.
Figure 11:
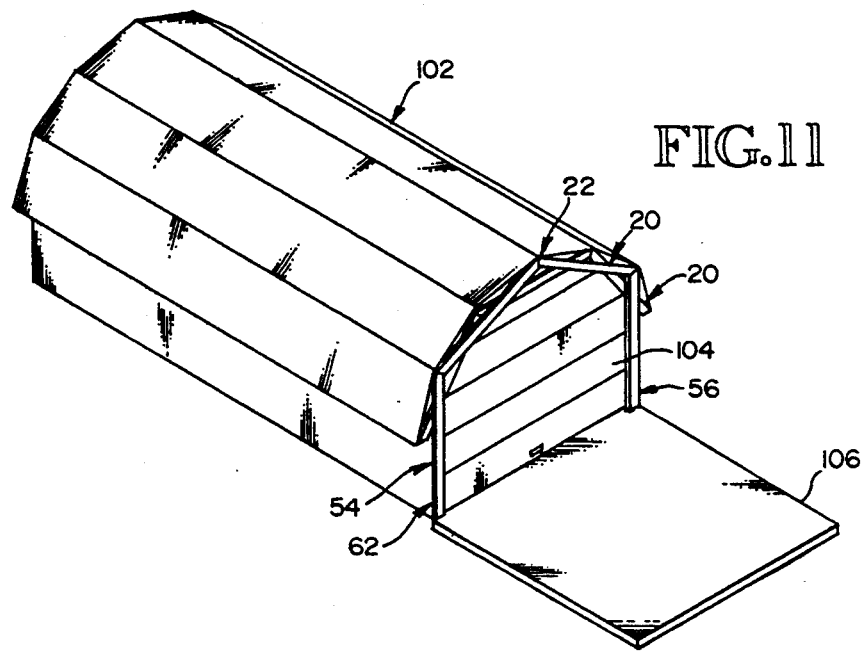
FIG. 11 is a perspective view of a vehicle garage, in which the roof trusses are foldable assemblies of like size and shape structural members.
Figure 12:
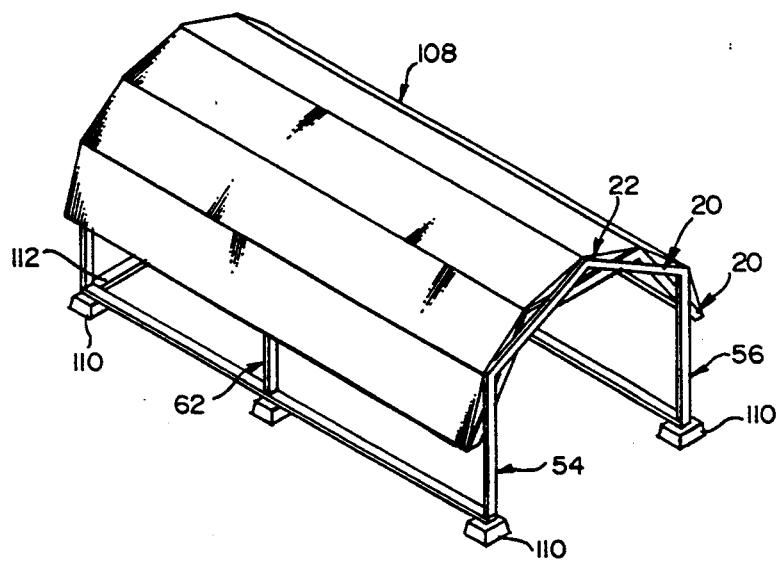
FIG. 12 is a perspective view of a somewhat open shelter, in which the roof trusses are foldable assemblies of like size and shape structural members, and also shown is the optional use of foundation blocks, with only one being shown at one corner.

Other designed buildings are illustrated in FIGS. 10, 11, and 12, which will include the like size and shape structural members 20, and optionally use the extra length portions 64 to create the columns 54, 56. Then the standard materials will be more durable in particular reference to the weather coverings. The building 96 illustrated in FIG. 10 is suitable for housing people. It will be insulated and there will be windows 98 and a door 84. The building 102 illustrated in FIG. 11 is suitable to completely enclose, for example, a vehicle. At the entry door 104, a parking-serving ramp 106 is formed using concrete. The building 108 shown in FIG. 12 serves as or like a carport, providing overhead shelter. Optionally, standard foundation blocks 100 could be used in reference to all these buildings. If they are not used, then lower transverse members 112 must be used between all columns 54, 56, to firmly complete the overall positioning of all the like size and shape structural members 20 of these truss-column embodiments 62.

Figure 4:
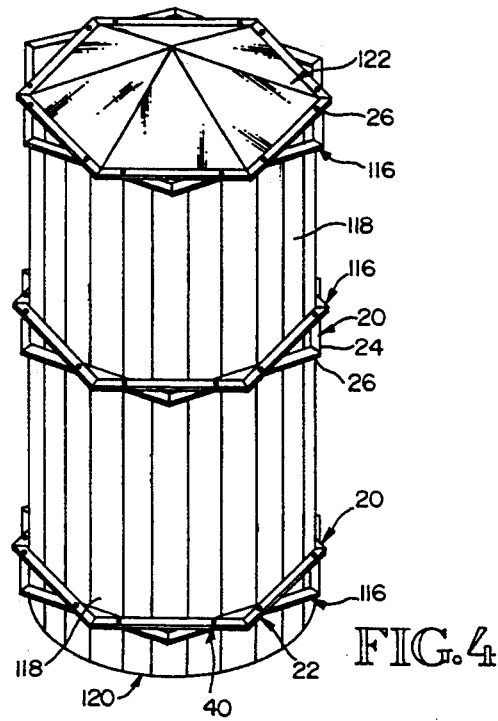
FIG. 4 is a perspective view of the structure shown in FIG. 3, having a top about to be rotated in place, to illustrate how the fully surrounding frames are spaced and connected to some other structural members, serving as wall members.
Figure 3:
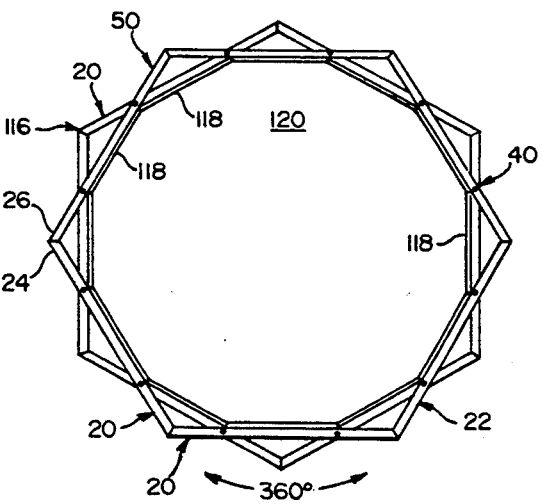
FIG. 3 is a top view of a structure without a roof installed, having fully surrounding frames made of like size and shape structural members, each serving as a principal member and arranged in a horizontal plane, and showing how some other structural members, serving as wall members, are arranged with them.

Like Size and Shape Structural Members Arranges Continuously, in Reference to 360 Degrees, and Positioned in Horizontal Planes, Serve as Respective Overall Size Principal Structural Members of Various Structures Having Various Purposes Structures such as silos 114, shown in FIG. 4, are made using the like size and shape structural members 20, which are continuously arranged, in reference to 360 degrees, as illustrated in FIGS. 3 and 4. After the last fastener 40 is installed, the resulting circular-frame embodiment 116 becomes a very rigid, strong, respective overall sized principal frame member 22. Other portions of this silo 114 are made of standard building materials, such as boards 118, concrete base 120, and roof 122.

Also liquid-tight liners 124 are included in these structures utilizing the circular-frame embodiments 116. In FIG. 13, a tank structure 126 is illustrated, serving as a hot tub 126, when such a liner 124 is included. Also liquid-tight liners 124 are used in larger tanks 128, as shown in FIG. 14. If the liquids pumped into and out of such larger tanks 128, are, for example, like oil, in respect to avoiding and/or containing spills, then a surrounding catch or containment basin 130 is provided. The raised walls 132 of the basin 130, serving as the spill boundary 132, have circular-frame embodiments 116 included, to support the expanded liquid-tight liner 124.

This arrangement of the containment basin 130 is also used where the main liquid tank is made of metal or plastic. The circular-frame embodiments 116 made of like size and shape structural members 20 serve very well with the expanded liquid-tight liner 124 in defining and maintaining the raised walls 132, of the basin 30, which serve as the spill boundary 132.

Like Size and Shaped Structural Members Arranged Continuously, in Reference to 360 Degrees, and Positioned in Vertical Planes, Serve as Respective Overall Size Principal Structural Members of Various Structures Having Various Purposes Structures such as living quarters 134 or storage volumes 134, illustrated in FIG. 15, to be used, for example, in the Arctic, Antarctic, tundra, and permafrost areas, are provided. These structures 134 used any place where foundations are not provided, or cannot be provided, by virtue of having their circular-frame embodiments 116 included in the overall structure of a building 134, provide excellent enclosures to be used for many purposes. The interiors are arranged to serve as living quarters, and/or to provide weatherproof shelter for equipment, etc.

The Basic Design Considerations in Reference to the Like Size and Shape Structural Members A schematic line diagram is presented in FIG. 16 to illustrate the derivation of the formulae-dimensions, and in FIG. 17 these dimensions are specifically indicated on one like size and shape structural member 20. The longitudinal centerline length of a member 20 is designated as L. It is equal to the radius of a circle passing through the pairs of bias opposite end surfaces 24, 26, where they bear against one another. This length L, and the radius, are also equal to the chord length. 1 The length L, In respect to where the holes 36, 38 are located, is used in the formulae-dimensions, by designating space, Y, between these holes, as being 0.4641016L, i.e. called 0,464L, and by designating the spaces, X, between each hole 36 or 38 and the end of the members 20 at their centerlines, as being 0.2679492L, i.e. called 0.268L.

Buildings and other structures of reasonable sizes to be used for many purposes are designed by first considering how large each like size and shape structural member 20 must be to create the right size respective overall size principal member 22 in a respective embodiment thereof, to serve with others of the like respective embodiment, when spaced apart and supported relative to one another, to provide the main overall frame of the intended structure.

I claim:

1. A foldable assembly of like size and shape structural members, foldable for handling, packaging, shipping, and storage, and unfolded and utilized, with each member being in compression, as principal members of structures, to be arranged either in a vertical plane, or in a horizontal plane, comprising:

a. twelve structural members of equal overall width, thickness, and length, the length being measured along the longitudinal centerline, where in:

each of the twelve structural members has their opposite end surfaces formed on a 60 degree bias, whereby one longitudinal edge surface of each of the twelve structural members is longer than the other opposite longitudinal edge surface, thereby creating opposite trapezoidal side surfaces, and each of the twelve structural members has two spaced holes positioned on the longitudinal centerline, and each of the holes is respectively equally spaced inwardly from the nearest biased opposite end surface; and b. fastener assemblies passing through respective aligned holes of respective interconnecting groups of three of the structural members, and being secured;

whereby two of the three structural members are positioned in one plane, and the remaining one of the three structural members is positioned in an adjacent parallel plane, resulting in the twelve structural members being connected together within the two adjacent parallel planes using the fastener assemblies; and thereafter the twelve structural members, after the removal of one fastener assembly, are pivoted together, in one direction, into a side by side convenient non-use compacted storage, handling, and transporting, configuration, and pivoted apart, in the opposite direction, into an end for end useful expanded structural configuration, wherein oppositely positioned end surfaces, formed on a 60 degree bias, are in an abutting relationship, and the foldable assembly is ready for use in the 360 degree configuration, when the previously removed one fastener assembly is reinserted.

2. A foldable assembly of like size and shape structural members, as claimed in claim 1, spaced apart with a selectable quantity of like foldable assemblies to serve as spaced apart main wall frames arranged in respective horizontal planes.

3. A foldable assembly of like size and shape structural members, as claimed in claim 2, comprising, in addition, vertical side by side members, extending between the like foldable assemblies serving as the spaced apart main wall frames arranged in respective horizontal planes, to complete an encircling continuous vertical wall structure.

4. A foldable assembly of like size and shape structural members, as claimed in claim 3, comprising, in addition, a liquid confining lining vertically supported by the spaced apart foldable assemblies forming a secondary cylindrical liquid receiving volume, adapted to encircle a tank of smaller diameter holding any liquid, serving as a primary liquid receiving volume, to be able to capture any spillage or leakage occurring in respect to an encircled smaller diameter tank to be located within the space defined by the vertical side by side members.

5. A foldable assembly of like size and shape structural members, as claimed in claim 3, comprising, in addition, bottom structure extending below the vertical side by side members.

6. A foldable assembly of like size and shape structural members, as claimed in claim 5, comprising, in addition, a liquid confining lining positioned within the space defined by vertical side by side members and over the bottom structure, extending below the vertical side by side members, thereby forming a cylindrical liquid receiving volume.

7. A foldable assembly of like size and shape structural members, as claimed in claim 5, comprising, in addition, top structure extending across the vertical side by side members.

8. A foldable assembly of like size and shape structural members, as claimed in claim 7 comprising, in addition, a liquid confining lining positioned within the area defined by the vertical side by side members forming a primary cylindrical liquid receiving volume that is ready to receive a liquid.

9. A foldable assembly of like size and shape structural members, as claimed in claim 8, comprising, in addition, a spaced surrounding secondary cylindrical liquid receiving volume of greater diameter than the primary cylindrical liquid receiving volume spaced away from and surrounding the primary liquid receiving to capture any spillage or leakage of liquid from the primary cylindrical liquid volume if filled with a liquid, comprising in addition:
 a. larger spaced apart foldable assemblies, of like size and shape structural members spaced apart with at least one other like larger assembly;
 b. vertical side by side members extending between these larger spaced apart foldable assemblies; and
 c. a liquid confining lining, vertically supported by these larger spaced apart foldable assemblies, and completing the forming of this greater diameter secondary cylindrical liquid receiving volume.

10. A foldable assembly of like size and shape structural members, as claimed in claim 1, spaced apart with a selectable quantity of like foldable assemblies to serve as spaced apart frames of a building in respective vertical planes.

11. A foldable assembly of like size and shape structural members, spaced apart with a selectable quantity of like foldable assemblies to serve as spaced apart frames of a building in respective vertical planes, as claimed in claim 10, comprising, in addition:
 stringer members spaced apart and connecting the spaced apart foldable assemblies of like size and shape structural members, thereby completing the overall main frame of a building.

12. A foldable assembly of like size and shape structural members and stringers, as claimed in claim 11, comprising, in addition:
 Wall boards secured to the overall main frame of a building;
 Roofing materials secured to the overall main frame of a building;
 Flooring materials secured to the overall main frame of a building;
 An access door secured to the overall main frame of a building, to complete an overall building structure.

* * * * *